(12) United States Patent
Mori et al.

(10) Patent No.: US 7,419,923 B2
(45) Date of Patent: Sep. 2, 2008

(54) OPTICAL GLASS

(75) Inventors: Yoshio Mori, Yokohama (JP); Masahiro Onozawa, Sagamihara (JP)

(73) Assignee: Kabushiki Kaisha Ohara, Kanagawa-Ken (JP)

( * ) Notice: Subject to any disclaimer, the term of this patent is extended or adjusted under 35 U.S.C. 154(b) by 681 days.

(21) Appl. No.: 10/504,112

(22) PCT Filed: Jan. 29, 2003

(86) PCT No.: PCT/JP03/00839

§ 371 (c)(1),
(2), (4) Date: Aug. 10, 2004

(87) PCT Pub. No.: WO03/072518

PCT Pub. Date: Sep. 4, 2003

(65) Prior Publication Data

US 2005/0231838 A1      Oct. 20, 2005

(30) Foreign Application Priority Data

Feb. 20, 2002 (JP) .............................. 2002-043402

(51) Int. Cl.
*C03C 3/19* (2006.01)
(52) U.S. Cl. ........................................ 501/47; 501/903
(58) Field of Classification Search ................... 501/47, 501/903
See application file for complete search history.

(56) References Cited

U.S. PATENT DOCUMENTS 3,785,835 A * 1/1974 Izumitani et al. ............... 501/47
3,798,041 A * 3/1974 Izumitani et al. ............... 501/47

FOREIGN PATENT DOCUMENTS

JP  50-74610 A * 6/1975
JP  52-68217 A * 6/1977
JP  2002211949 A * 7/2002
SU  316661 A * 12/1971

OTHER PUBLICATIONS

Derwent Abstract 2003-032619, abstract of JP 2002-211949 A.*
Machine Translation of JP 2002-211949 A.*
Derwent Abstract 1972-43341T, abstract of SU 316661 A.*
Derwent Abstract 1977-51163Y, abstract of JP 52-068217 A.*
Derwent Abstract 1976-79901X, abstract of JP 50-074610 A.*

* cited by examiner

*Primary Examiner*—Jerry Lorengo
*Assistant Examiner*—Elizabeth A Bolden
(74) *Attorney, Agent, or Firm*—James V. Costigan; Hedman & Costigan, P.C.

(57) ABSTRACT

An optical glass comprising in mass %:

| | |
|---|---|
| $P_2O_5$ | 25%-less than 45% |
| $B_2O_3$ | 6-20% |
| BaO | 24%-less than 40% |
| ZnO | 3-14% |
| MgO | 0-15% |
| CaO | 0-15% |
| SrO | 0-15% |
| $Li_2O$ | 0-5% |
| $Na_2O$ | 0-5% |
| $K_2O$ | 0-5% |
| $WO_3$ | 0-5% and |
| $Al_2O_3$ | 0-5%. |

The optical glass should preferably contain 0.1-5% $WO_3$, 3.6-15% MgO, 0.1-5% $Li_2O+Na_2O+K_2O$, 0—less than 0.5% and $Sb_2O_3+As_2O_3$ with the mass ratio of ZnO/BaO being 0.12—less than 0.50. The optical glass should preferably have refractive index (nd) within a range from 1.54 to 1.65 and Abbe number (vd) within a range exceeding 57 up to 69 and liquid phase temperature within a range from 870° C. to 930° C. There is provided an optical glass having high resistance to devitrification and medium refractive index and low dispersion characteristics which is free of ingredients such as $Ta_2O_5$ having a high cost of raw material and therefore can be manufactured at a relatively low cost of raw materials.

7 Claims, No Drawings

OPTICAL GLASS

TECHNICAL FIELD

This invention relates to an optical glass having medium refractive index and low dispersion characteristics and having high resistance to devitrifiction.

BACKGROUND ART

Optical elements such as lenses are usually manufactured by press molding an optical glass by either direct pressing or reheat pressing. Direct pressing is a method according to which temperature of melted glass gob of a predetermined weight is lowered to molding temperature and, at the molding temperature, the glass gob is press molded by a mold.

Reheat pressing is a method according to which glass gob of a predetermined weight obtained by cooling and solidifying melted glass is reheated to the molding temperature region and, at the molding temperature, the glass gob is press molded by a mold.

It is well known that, when glass is held in a devitrification temperature region which is lower than liquid phase temperature of the glass, devitrification occurs and grows, though the speed of growth is low or high depending upon the composition of the optical glass. In a glass having a high liquid phase temperature, the liquid phase temperature widely exceeds the molding temperature region and, therefore, in the above described pressing of the glass, there tends to occur long duration of time during which the glass is held in the devitrification temperature region which is lower than the liquid phase temperature while the temperature of the glass is lowered or raised until molding of the glass and while the glass is being molded and this gives rise to devitrification.

An optical glass having medium refractive index and low dispersion characteristics, particularly an optical glass having optical constants of refractive index (nd) within a range of about 1.54-1.65 and Abbe number (vd) within a range of about 57-69 is useful in optical design. Known in the art as an optical glass having such optical constants are several glasses which are generally known as dense phosphate crown glasses. For increasing refractive index, these glasses mostly comprise ingredients such as $Ta_2O_5$ made of expensive raw materials which are added to a phosphate glass which originally has a low refractive index. Since the cost of manufacture of these glasses is high, only a very few of them are manufactured on an industrial scale.

As a glass having similar optical constants to those described above, there is disclosed a $P_2O_5$—ZnO optical glass suitable for precision mold pressing (e.g., Patent Literature 1). This glass, however, has the problem that it has a high liquid phase temperature. As described above, a glass having a high liquid phase temperature tends to give rise to devitrification while the temperature of the glass is lowered or raised until molding of the glass and while the glass is being molded and, therefore, it is difficult to manufacture, on a stable basis, optical elements such as lenses which require a high homogeneity. This glass therefore cannot be practically used.

Known also in the art are phosphate optical glasses comprising $Ta_2O_5$ (e.g., Patent Literature 2 and 3). The glass containing $Ta_2O_5$ however requires a very high cost of raw materials.

Patent Literature 1: Japanese Patent Application Laid-open Publication No. Hei 2-124743

Patent Literature 2 Japanese Patent Publication No. Sho 38-5013

Patent Literature 3 Japanese Patent Application Laid-open Publication No. Sho 52-68217

It is an object of the present invention to provide an optical glass which has comprehensively eliminated the above described disadvantages of the prior art, has high resistance to devitrification, has medium refractive index and low dispersion characteristics, and is free of expensive raw materials such as $Ta_2O_5$ and therefore can be manufactured at a relatively low cost of raw materials.

DISCLOSURE OF THE INVENTION

Laborious studies and experiments made by the inventors of the present invention for achieving the above described objects of the invention have resulted in the finding, which has led to the present invention, that a glass which has high resistance to devitrification, has medium refractive index and low dispersion characteristics and can be manufactured at a relatively low cost of raw materials can be obtained in a $P_2O_5$—$B_2O_3$—BaO—ZnO glass of a specific composition which has hitherto been unknown in the art.

| | |
|---|---|
| $P_2O_5$ | 25%-less than 45% |
| $B_2O_3$ | 6-20% |
| BaO | 24%-less than 40% |
| ZnO | 3-14% |
| MgO | 0-15% |
| CaO | 0-15% |
| SrO | 0-15% |
| $Li_2O$ | 0-5% |
| $Na_2O$ | 0-5% |
| $K_2O$ | 0 5% |
| $WO_3$ | 0-5% |
| $Al_2O_3$ | 0-5% |
| and being free of $Ta_2O_5$ | |

An optical glass of embodiment 2 is one as defined in embodiment 1 which is characterized by comprising, in mass %, 0.1-5% $WO_3$.

An optical glass of embodiment 3 is one as defined in embodiment 1 or 2 which is characterized by comprising, in mass %, 3.6-15% MgO.

An optical glass of embodiment 4 is one as defined in any of embodiment 1-3 which is characterized by comprising, in mass %, 0.1-5% $Li_2O+Na_2O+K_2O$.

An optical glass of embodiment 5 is one as defined in any of embodiments 1-4 which is characterized in that mass ratio of ZnO/BaO is within a range from 0.12 to less than 0.50.

An optical glass of embodiment 6 is one as defined in any of embodiments 1-5 which is characterized by comprising, in mass %, 0—less than 0.5% $Sb_2O_3+As_2O_3$.

An optical glass of embodiment 7 is one as defined in any of embodiments 1-6 which is characterized by having optical constants of refractive index (nd) within a range 1.54 to 1.65 and Abbe number (vd) within a range exceeding 57 up to 69.

An optical glass of embodiment 8 is one as defined in any of embodiments 1-7 which is characterized by having liquid phase temperature within a range from 870° C. to 930° C.

Reasons for limiting the composition ranges of respective ingredients of the optical glass made according to the present invention as described above will now be described.

The $P_2O_5$ ingredient is a glass forming oxide in the glass of the present invention and is indispensable for the glass. If the amount of this ingredient is less than 25%, the glass becomes instable and difficulty arises in vitrification. If the amount of this ingredient 45% or over, mechanical properties of the glass are deteriorated.

The $B_2O_3$ ingredient is effective for restraining occurrence of opaqueness in the glass of the present invention which contains the $P_2O_5$ ingredient. If the amount of this ingredient is less than 6%, it becomes difficult to achieve this effect. If the amount of this ingredient exceeds 20%, chemical durability of the glass is deteriorated and the glass tends to be colored.

The BaO ingredient is an important ingredient which, by adding to the glass together with the ZnO ingredient to be described later, has been found to be effective for greatly improving resistance to devitrification of the glass. If the amount of this ingredient is less than 24%, it is difficult to achieve this effect and, if the amount of this ingredient is 40% or over, chemical durability of the glass is deteriorated.

The ZnO ingredient is an important ingredient in the present invention in that it is effective for improving chemical durability of the glass and resistance to devitrification, particularly advantageous in improving resistance to devitrification. As described above, this ingredient, together with the BaO ingredient, improves resistance to devitrification significantly. If the amount of this ingredient is less than 3%, these effect cannot be obtained whereas if the amount of this ingredient exceeds 14%, the liquid phase temperature increases and, as a result, resistance to devitrification deteriorates rather than increases.

It is preferable to limit the mass ratio of ZnO/BaO within a range from 0.12 to less than 0.50 because it improves resistance to devitrification further. A particularly preferable range of ZnO/BaO is 0.18-0.48.

The MgO ingredient is effective for improving the melting property and chemical durability, particularly water-proof property of the glass. If the amount of this ingredient exceeds 15%, stability of the glass tends to decrease. For improving water-proof property of the glass, the amount of this ingredient should preferably be 3.6% or more. For obtaining glass with excellent water resistance, a particularly preferable range of this ingredient is 4%-15%.

The CaO and SrO ingredients may be optionally added for adjusting optical constants. If, however, the amount of these ingredients exceeds 15% respectively, stability of the glass tends to decrease.

The $Li_2O$, $Na_2O$ and $K_2O$ ingredients are effective for improving the melting property and stability of the glass. If the total amount of one or more of these ingredients exceeds 5%, chemical durability of the glass is deteriorated.

For facilitating production of a homogeneous glass by improving the melting property and stability of the glass, it is preferable to add one or more of these ingredients in a total amount of 0.1% or over.

The $WO_3$ ingredient is effective for increasing refractive index of the glass. Addition of this ingredient in an amount exceeding 5%, however, is not preferable because coloration and devitrification of the glass tend to increase. For easily obtaining a glass having refractive index (nd) of 1.54 or over, it is preferable to add this ingredient in an amount of 0.1% or over.

The $Al_2O_3$ ingredient is effective for improving chemical durability of the glass. If, however, the amount of this ingredient exceeds 5%, resistance to devitrification is deteriorated.

Since the glass of the present invention has good melting property and defoaming property, a foamless, homogeneous glass can be obtained without addition of a refining agent. The $Sb_2O_3$ and/or $As_2O_3$ ingredient may, however, be added as a refining agent in the total amount of less than 0.5%. In case these refining agents are added, $Sb_2O_3$ is preferable to $As_2O_3$ from the standpoint of protecting the environment.

EXAMPLES OF THE INVENTION

Compositions of examples (Nos. 1 to 15) of the optical glass according to the invention and composition of a comparative example (No. A) of the prior art optical glass are shown in Tables 1-3 together with results of measuring of refractive index (nd), Abbe number (vd) and liquid phase temperature (° C.). As to the liquid phase temperature (° C.), a predetermined number of glass specimens were produced for each glass of the examples and comparative example. These specimens were placed on small holes formed in a platinum plate and this platinum plate was held for 30 minutes in a temperature gradient furnace having a temperature gradient within a range from 850° C. to 1000° C. The specimens were then taken out of the furnace and cooled to room temperature and generation of crystal was microspically observed for each of these specimens. The lowest temperature of each specimen at which generation of crystal was not observed was adopted as the liquid phase temperature of the specimen.

TABLE 1

(mass %)

| | Example No. | | | | | |
|---|---|---|---|---|---|---|
| | 1 | 2 | 3 | 4 | 5 | 6 |
| $P_2O_5$ | 37.8 | 29.0 | 31.0 | 32.0 | 32.9 | 32.2 |
| $B_2O_3$ | 8.0 | 7.0 | 12.0 | 6.0 | 13.1 | 6.0 |
| BaO | 39.9 | 39.5 | 26.4 | 30.5 | 33.0 | 30.0 |
| ZnO | 8.6 | 7.2 | 10.0 | 11.0 | 13.0 | 14.0 |
| MgO | 1.2 | 2.3 | 9.0 | 6.0 | | 7.0 |
| CaO | 2.0 | 12.0 | 11.0 | 9.0 | 7.0 | 2.4 |
| $WO_3$ | 2.0 | 3.0 | | 5.0 | | 2.0 |
| $Al_2O_3$ | 0.5 | | 0.5 | | 1.0 | 1.5 |
| $Na_2O$ | | | 0.1 | 0.4 | | 4.8 |
| $K_2O$ | | | | 0.1 | | |
| $Li_2O$ | | | | | | 0.1 |
| ZnO/BaO | 0.22 | 0.18 | 0.38 | 0.36 | 0.39 | 0.47 |
| nd | 1.6129 | 1.6392 | 1.6204 | 1.6058 | 1.6105 | 1.5691 |
| v d | 61.79 | 59.63 | 63.92 | 58.09 | 63.30 | 68.70 |
| Liquid phase Temperature (° C.) | 897 | 884 | 898 | 895 | 880 | 900 |

TABLE 2

| | \multicolumn{6}{c}{Example No.} (mass %) |
| --- | --- | --- | --- | --- | --- | --- |
| | 7 | 8 | 9 | 10 | 11 | 12 |
| $P_2O_5$ | 40.0 | 41.0 | 42.1 | 44.9 | 27.0 | 25.0 |
| $B_2O_3$ | 7.0 | 13.0 | 10.5 | 20.0 | 16.0 | 8.7 |
| BaO | 24.9 | 28.0 | 26.0 | 25.1 | 33.5 | 36.0 |
| ZnO | 7.5 | 13.5 | 3.0 | 5.9 | 11.0 | 10.0 |
| MgO | 7.0 | 4.4 | 5.0 | 2.5 | 3.0 | 2.0 |
| CaO | 8.0 | | 3.9 | | 4.0 | 15.0 |
| $WO_3$ | 1.0 | 0.1 | 4.5 | 1.4 | 1.0 | 1.5 |
| $Al_2O_3$ | | | | | 4.5 | 1.8 |
| $Na_2O$ | 0.1 | | 0.5 | 0.2 | | |
| $K_2O$ | 4.5 | | | | | |
| $Li_2O$ | | | 4.5 | | | |
| ZnO/BaO | 0.30 | 0.48 | 0.12 | 0.24 | 0.33 | 0.28 |
| nd | 1.5996 | 1.5770 | 1.5999 | 1.5559 | 1.6110 | 1.6400 |
| v d | 59.50 | 64.39 | 62.61 | 67.89 | 64.16 | 66.60 |
| Liquid phase Temperature(° C.) | 885 | 905 | 887 | 898 | 886 | 884 |

TABLE 3

| | \multicolumn{3}{c}{Example No.} (mass %) | Comparative |
| --- | --- | --- | --- | --- |
| | 13 | 14 | 15 | Example A |
| $P_2O_5$ | 39.0 | 25.0 | 34.3 | 45.0 |
| $B_2O_3$ | 9.3 | 17.0 | 10.2 | |
| BaO | 27.0 | 38.0 | 34.7 | 19.0 |
| ZnO | 5.7 | 8.0 | 8.1 | 25.0 |
| MgO | 14.0 | 11.0 | 4.1 | |
| CaO | 4.5 | 1.0 | 5.9 | 5.0 |
| $WO_3$ | 0.5 | | 0.5 | |
| $Al_2O_3$ | | | 2.0 | 2.0 |
| $Na_2O$ | | | 0.2 | |
| $Li_2O$ | | | | 4.0 |
| ZnO/BaO | 0.21 | 0.21 | 0.23 | 1.32 |
| nd | 1.6067 | 1.6287 | 1.6159 | 1.6128 |
| v d | 64.91 | 64.11 | 62.70 | 60.70 |
| Liquid phase Temperature(° C.) | 878 | 875 | 880 | 950 |

As shown in Tables 1-3, the glasses of Example No. 1 to No. 15 have liquid phase temperature of 905° C. or below which is much lower than the prior art glass of Comparative Example No. A, and thus have superior resistance to devitrification to the prior art glass. For example, the glasses of Example No. 1 and No. 2 which have optical constants nearly equivalent to those of Comparative Example No. A have liquid phase temperature which is lower by more than 50° C. and therefore have apparently superior resistance to devitrifivation to Comparative Example No. A.

The glasses of Example No. 1 to No. 15 all have optical constants of refractive index (nd) within the range of 1.54-1.65 and Abbe number (vd) exceeding 57 up to 69, thus having medium refractive index and low dispersion characteristics.

For manufacturing the optical glasses of Example No. 1 to No. 15 shown in Tables 1 to 3, ordinary glass materials for an optical glass such as phosphates, phosphoric acid, oxides, carbonates, nitrates and hydroxides were weighed and mixed in ratios for realizing compositions of the examples of Tables 1 to 3 and put in a platinum crucible and melted at 1100° C. to 1300° C. for about three to five hours depending upon the melting property of the glass determined by the composition. The melt was stirred and homogenized and, then, the melt was cast into a mold and annealed to produce the glass. The glasses of the examples of the present invention all had excellent melting property and chemical durability.

INDUSTRIAL APPLICABLITY

As described above, the optical glass of the present invention is a $P_2O_5$—$B_2O_3$—BaO—ZnO glass within a specific composition range. The optical glass has medium refractive index and low dispersion characteristics which are advantageous for optical design. Particularly, since the optical glass has refractive index (nd) within a range from 1.54 to 1.65 and Abbe number (vd) within a range exceeding 57 up to 69 and has low liquid phase temperature and high resistance to devitrification, no devitrification is produced in forming glass and, therefore, the optical glass is advantageous in that a homogeneous optical glass and optical elements such as lens formed from the optical glass can be easily produced. Further, the optical glass of the invention does not contain ingredients such as $Ta_2O_5$ which have a very high cost of raw material and, therefore, the optical glass is advantageous over the prior art glasses in the cost of manufacture and therefore is suited for commercial production on a large scale.

What is claimed is:

1. An optical glass comprising in mass %:

| | |
| --- | --- |
| $P_2O_5$ | 25%-less than 45% |
| $B_2O_3$ | 6-20% |
| BaO | 24%-less than 40% |
| ZnO | 3-14% |
| MgO | 0-15% |
| CaO | 0-15% |
| SrO | 0-15% |
| $Li_2O$ | 0-5% |
| $Na_2O$ | 0-5% |
| $K_2O$ | 0-5% |
| $WO_3$ | 0-5% |
| $Al_2O_3$ | 0.1-5% |//
| and being free of $Ta_2O_5.$ | |

2. An optical glass as defined in claim 1 comprising, in mass %, 3.6-15% MgO.

3. An optical glass as defined in claim 1 comprising, in masst %, 0.1-5% $Li_2O + Na_2O + K_2O$.

4. An optical glass as defined in claim 1 wherein mass ratio of ZnO/BaO is within a range from 0.12 to less than 0.50.

5. An optical glass as defined in claim 1 comprising, in mass %, 0—less than 0.5% $Sb_2O_3 + As_2O_3$.

6. An optical glass as defined in claim 1 having optical constants of refractive index (nd) within a range from 1.54 to 1.65 and Abbe number (vd) within a range exceeding 57 up to 69.

7. An optical glass as defined in claim 1 having liquid phase temperature within a range from 870° C. to 930° C.

* * * * *

UNITED STATES PATENT AND TRADEMARK OFFICE
CERTIFICATE OF CORRECTION

PATENT NO.        : 7,419,923 B2
APPLICATION NO.   : 10/504112
DATED             : September 2, 2008
INVENTOR(S)       : Yoshio Mori and Masahiro Onozawa Page 1 of 1

It is certified that error appears in the above-identified patent and that said Letters Patent is hereby corrected as shown below:

Col. 6, Claim 1, line 12, rewrite $WO_3$ from "0 - 5%" to --0.1 - 5%--

Signed and Sealed this

Fifteenth Day of September, 2009

David J. Kappos
*Director of the United States Patent and Trademark Office*